United States Patent
Tipton et al.

(10) Patent No.: US 6,453,940 B1
(45) Date of Patent: Sep. 24, 2002

(54) INSERT BONDED COMBINATION VALVE

(75) Inventors: Larry J. Tipton, Kokomo; Aaron E. Kiser, Royal Center, both of IN (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 09/467,273

(22) Filed: Dec. 20, 1999

(51) Int. Cl.⁷ .......................... F16K 17/26; F04B 53/10
(52) U.S. Cl. .................. 137/493.9; 137/846; 137/849; 251/332; 251/358; 417/567; 417/571; 29/890.127
(58) Field of Search ............... 137/493.9, 846, 137/849, 843, 844; 417/566, 567, 571; 29/890.127; 251/332, 358

(56) References Cited

U.S. PATENT DOCUMENTS

| | | | |
|---|---|---|---|
| 3,159,176 A | * 12/1964 | Russell et al. | 137/846 |
| 3,326,520 A | 6/1967 | Guenther | 251/358 |
| 3,381,351 A | 5/1968 | Szwargulski | 29/156.7 |
| 3,664,774 A | * 5/1972 | Tupper et al. | 137/846 |
| 3,710,942 A | 1/1973 | Rosenberg | 137/846 |
| 3,861,646 A | * 1/1975 | Douglas | 251/356 |
| 3,941,149 A | 3/1976 | Mittleman | 137/493.1 |
| 4,077,429 A | * 3/1978 | Kimball | 137/846 |
| 4,084,606 A | 4/1978 | Mittleman | 137/102 |
| 4,341,239 A | 7/1982 | Atkinson | 137/493 |
| 4,434,810 A | 3/1984 | Atkinson | 137/493 |
| 4,458,711 A | * 7/1984 | Flider | 137/846 |
| 4,989,590 A | 2/1991 | Baum et al. | 128/66 |
| 5,237,309 A | * 8/1993 | Frantz et al. | 417/566 |
| 5,320,134 A | * 6/1994 | Singh | 137/846 |
| 6,035,896 A | * 3/2000 | Liardet | 137/849 |

* cited by examiner

Primary Examiner—Michael Powell Buiz
Assistant Examiner—Ramesh Krishnamurthy
(74) Attorney, Agent, or Firm—Baker & Daniels

(57) ABSTRACT

A combination valve including a metal sleeve and a valve body. The valve body is formed of a resilient material and insert bonded or vulcanized to the metal sleeve and includes a cylindrical elongated member defining a passageway therethrough and an annular umbrella portion integrally extending from the elongated member. The elongated member is disposed within the metal sleeve and has converging flexible lips. The metal sleeve includes a plurality of prongs at one end and the valve body includes a top surface. The prongs of the metal sleeve extend to the top surface of the valve body, whereby the valve can be press-fitted into location without damaging the valve body. Between the prongs of the metal sleeve are gaps which permit the molding material to flow from the umbrella portion to the elongated member during the molding of the combination valve.

13 Claims, 2 Drawing Sheets

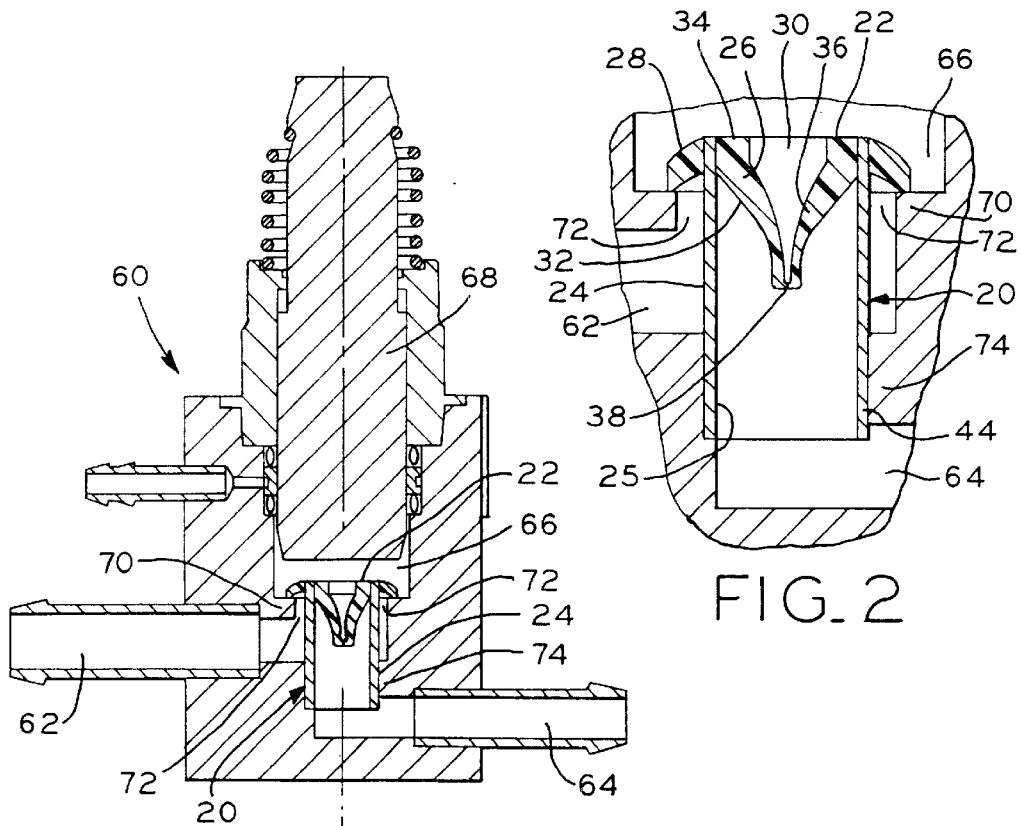
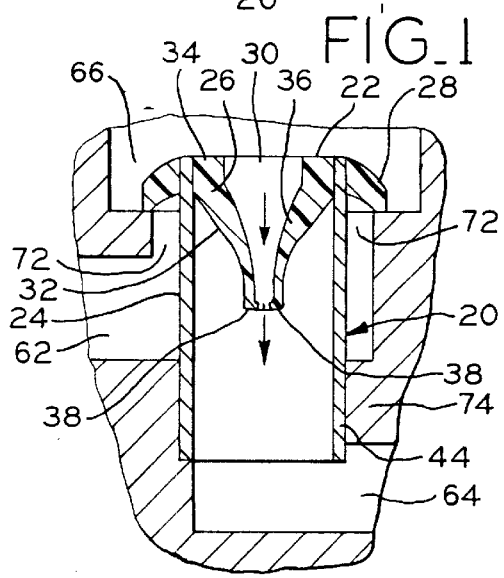
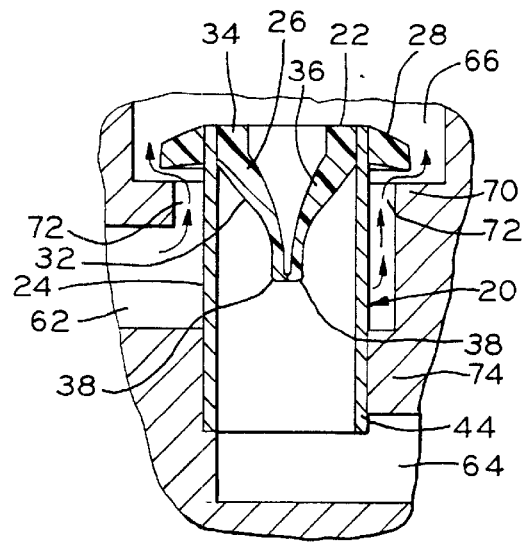

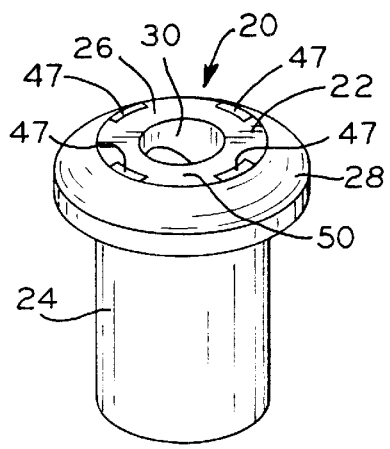
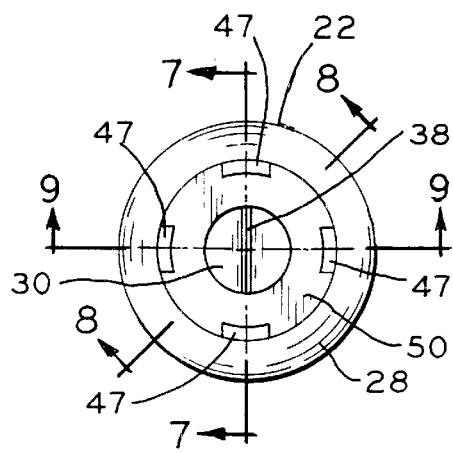
FIG_5  FIG_6
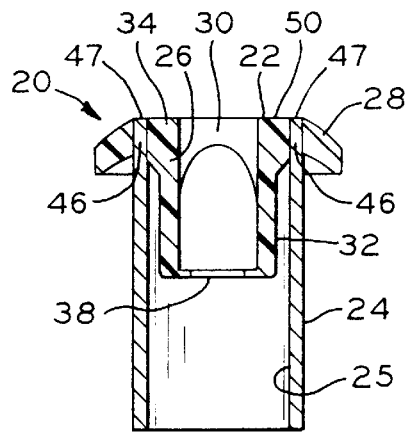
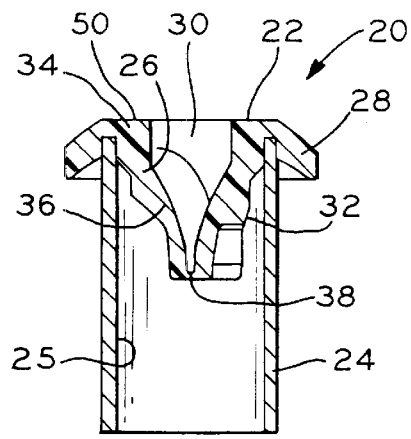
FIG_7  FIG_8
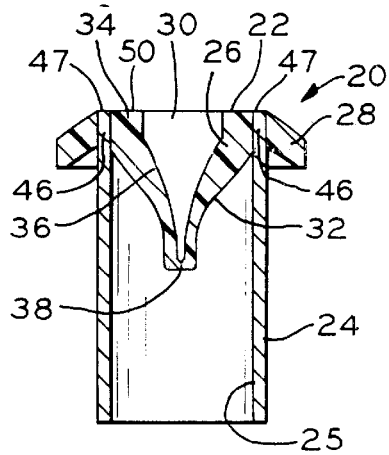
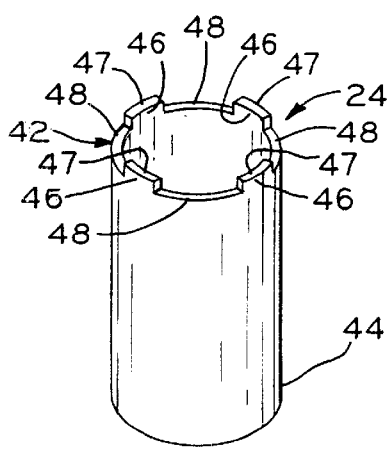
FIG_9  FIG_10

INSERT BONDED COMBINATION VALVE

BACKGROUND OF THE INVENTION

1. Field of the Invention

The present invention relates to combination fluid valves, and in particular to combination valves permitting bidirectional flow responsive to changes in pressure differential.

2. Description of the Related Art

Current combination fluid valves of the duckbill-umbrella variety having a metal sleeve, which allows the combination valve to be press-fitted into a retainer section of the device in which bidirectional fluid control is required, include a valve body formed of a resilient member. The valve body attaches to the metal sleeve using a retention portion on the valve body and a corresponding lip on the metal sleeve. The valve body is inserted into the metal sleeve with the retention portion pushed past and locking with the corresponding lip. These combination valves are adequate for low pressure applications, such as a water pump for a windshield wiper, for example, but are not acceptable for use at higher pressures, such as in a piston pump for a fuel injection system, for example.

One problem of current combination fluid valves is that at higher pressures the retention portion of the valves are torn away as the pulsing pressure fatigues the resilient material at the retention portion.

Another problem of current combination fluid valves is that the valve body can be damaged when the valve is pressed into position.

It is therefore an object of the present invention to provide a bi-directional umbrella type valve which is suitable for use at higher pressures such as are encountered in fuel injection systems.

SUMMARY OF THE INVENTION

The present invention involves a combination valve including a valve body having a duckbill portion and an umbrella portion, and a metal sleeve. The metal sleeve is insert bonded or vulcanized to the umbrella portion and surrounds the duckbill portion to create a very small profile valve with an excellent compression ratio. The metal sleeve has a crenelated end with a plurality of prongs. Gaps located between the prongs of the metal sleeve are used in the process of insert bonding the valve body to the metal sleeve. The prongs on the crenelated end of the metal sleeve allow the combination valve to be pressed into place without damaging the valve body.

The present invention provides a combination valve including a metal sleeve and a resilient valve body. The valve body is integrally bonded to the metal sleeve and includes an elongated member defining a passageway therethrough and an annular portion integral with and extending from the elongated member. The elongated member is disposed within the metal sleeve and defines a plurality of flexible lips.

The present invention also provides a combination valve including a metal sleeve and a resilient valve body. The valve body is integrally bonded to the metal sleeve. The valve body has a first and a second portion. The first portion prevents transfer of fluid in a first direction and is responsive at a first predetermined fluid pressure in a second direction to permit transfer of fluid in the second direction. The second portion prevents transfer of fluid in a second direction and is responsive at a second predetermined fluid pressure in the first direction to permit fluid flow in the first direction.

The present invention further provides a combination valve including a metal sleeve and a resilient valve body. The metal sleeve includes a crenelated end having a plurality of prongs. The valve body is attached to the metal sleeve. The valve body includes a generally planar surface. The prongs of the metal sleeve extend to the planar surface, whereby the valve can be press-fitted into place without damaging the valve body.

The present invention also provides a method of making a combination valve. The steps including providing a mold and a metal sleeve with a crenelated end having a plurality of prongs with gaps therebetween, providing a molding material for forming a resilient valve body, inserting the metal sleeve into a chamber of the mold, forcing the molding material into the mold to form the valve body using the gaps to flow the molding material from the umbrella portion to the elongated member portion of the mold, curing the valve body, and removing the combination valve from the mold.

One advantage of the inventive combination fluid valves is that the valve body is insert bonded to the metal sleeve eliminating the retention portion of prior art valves and allowing the use of the combination valve at higher pressures.

Another advantage of the combination fluid valve is that the combination valve can be pressed into the device in which bidirectional fluid control is required without damaging the valve body due to the prongs of the crenelated end of the metal sleeve extending to the top of the valve body.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a sectional view of a piston pump including a combination valve according to the present invention;

FIG. 2 is an enlarged partial sectional view of the piston pump of FIG. 1 with the combination valve preventing fluid flow;

FIG. 3 is an enlarged partial sectional view of the piston pump of FIG. 1 with the combination valve allowing the output of fluid from a chamber in the piston pump through the duckbill portion of the combination valve;

FIG. 4 is an enlarged partial sectional view of the piston pump of FIG. 1 with the combination valve allowing the intake of fluid into the chamber of the piston pump through the umbrella portion of the combination valve;

FIG. 5 is a perspective view of the inventive combination valve;

FIG. 6 is a top view of the combination valve of FIG. 5;

FIG. 7 is a sectional side view of the combination valve of FIG. 6 along view line 7—7;

FIG. 8 is a sectional side view of the combination valve of FIG. 6 along view line 8—8;

FIG. 9 is a sectional side view of the combination valve of FIG. 6 along view line 9—9; and FIG. 10 is a perspective view of the metal sleeve.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described as the preferred embodiment so that others skilled in the art may utilize its teachings.

Referring to FIG. 1, a combination valve, in accordance with the present invention and generally referenced as 20, is shown in piston pump 60 of a fuel injection system. Piston pump 60 includes inlet 62, outlet 64, chamber 66, and piston 68. Combination valve 20 controls the flow of fluid from inlet 62 into chamber 66 and from chamber 66 out outlet 64.

Referring now to FIGS. 5 through 9, combination valve 20 includes valve body 22 and metal sleeve 24. Valve body 22 is formed of an elastic, resilient material, such as, for example, rubber, including latex, synthetic rubber, silicone rubber, or a plastic material and includes cylindrical elongated member 26 and annular umbrella portion 28. Elongated member 26 defines passageway 30 and includes lower portion 32 and upper portion 34. Lower portion 30 includes flexible converging member 36. Umbrella portion 28 extends from upper portion 34 and may seat against a fluid restraining section 70 (FIG. 1) of piston pump 60 covering one or more fluid passageways 72 defined by fluid restraining section 70 and combination valve 20.

Lower portion 32 is formed integrally with and is aligned axially longitudinally with upper portion 34. Lower portion 32 is tapered inwardly from upper portion 34 to facilitate insertion of elongated member 26 into aperture 25 defined by metal sleeve 24. As shown in FIG. 7, lower portion 32 maintains a constant outer diameter after the initial tapering from upper portion 34 and a constant inner diameter, when viewed sectioned between lips 38. The inner diameter of lower portion 32 is equivalent to the inner diameter of upper portion 34 in the this view. In FIG. 9 lower portion 32 shows constant tapering from upper portion 34 to lips 38, when viewed sectioned through both lips 38. FIG. 8 shows the transitioning of the constant diameter to the constant tapering of lower portion 32, when viewed sectioned through yet another plane. The dimensioning and degree of tapering of lower portion 32 is dependent on the application of the combination valve, its desired size, and the desired pressure differential to open passageway 30.

Lips 38 of converging member 36 of lower portion 32 in FIG. 9 have a "duckbill" configuration. Converging member 36 is biased radially inwardly so that lips 38 normally press against each other to prevent the flow of fluid through passageway 30. Lips 38 form a V-shape and flex outward in response to a predetermined pressure head in open passageway 30. Converging member 36 converges in the direction of desired fluid flow. Converging member 36 will restrict or check the flow of fluid through passageway 30 in the opposite direction of the desired fluid flow as fluid pressure in aperture 25 pushes lips 38 shut.

Lower portion 32 strengthens and rigidifies converging member 36 by reducing its flexibility. This makes it more difficult to separate converging member 36. The thicker the lower portion 32 which surrounds converging member 36, the more difficult it is to separate converging member 36. Due to the strength and rigidity of lower portion 32, lips 38 will not open or yield below a predetermined amount of pressure. Thus lower portion 32 serves to bias converging member 36 and lips 38 in a normally closed position to a far greater extent than if lower portion 32 were not present surrounding converging member 36. Adjusting the thickness of lower portion 32 changes the amount of pressure required to open passageway 30. Likewise, the thickness of umbrella portion 28 determines the amount of pressure required to flex umbrella portion 28 and open passageways 72. Lips 38 and umbrella portion 28 both serve as check valves.

Upper portion 34 includes planar surface 50 in which upper surfaces 47 of prongs 46 (FIG. 10) extend to. As shown in FIGS. 7 through 9, upper portion 34 maintains a constant inner diameter for passageway 30 throughout its length with the outer diameter variable due to prongs 46. FIGS. 7 and 9 show a constant outer diameter for upper portion 34 throughout its length, when viewed sectioned through prongs 46. FIG. 8 shows the connection of umbrella portion 28 to upper portion 34, when viewed sectioned through an area between prongs 46.

Referring now to FIG. 10, metal sleeve 24 includes crenelated end 42 and opposite end 44. Crenelated end 42 includes a plurality of prongs 46 with a plurality of gaps 48 therebetween. Gaps 48 are utilized during the compression molding of valve body 22 to metal sleeve 24 to permit the flow of the molding material from the umbrella portion to the elongated member portion of the mold. Opposite end 44 is press-fitted to retainer section 74 (FIG. 1) in piston pump 60. Prongs 46 extend to top surface 50 of valve body 22 (FIGS. 7 and 9) with upper surfaces 47 exposed so that combination valve 20 can be press-fitted into location without damaging valve body 22. Valve body 22 is insert bonded or vulcanized to metal sleeve 24.

To make combination valve 20 as shown in FIG. 5 using insert bonding or vulcanizing, metal sleeve 24 having crenelated end 42 is inserted into a combination valve mold having a chamber for metal sleeve 24 with upper surfaces 47 of prongs 46 seated against the mold. A suitable molding material is forced into the mold at the tip of umbrella portion 28 to form a one piece valve body 22 using gaps 48 between prongs 46 to flow the molding material from umbrella portion 28 to elongated member 26 or from the outside to the inside of metal sleeve 24. Valve body 22 is cured and combination valve 20 is removed from the mold.

Referring now to FIGS. 2 through 4 in operation, combination valve 20 controls the flow of fluid from inlet 62 into chamber 66 and out outlet 64. In FIG. 2 umbrella portion 28 is seated against fluid restraining section 70 to prevent the flow of fluid in an upward direction through passageways 72 from inlet 62 into chamber 66 and passageway 30 is normally closed by converging member 36 to prevent the flow of fluid in an upward direction from outlet 64 into chamber 66 or the flow of fluid in a downward direction from chamber 66 to outlet 64. In FIG. 4 when the pressure in the upward direction from inlet 62 through passageways 72 in fluid restraining section 70 exceeds a first predetermined amount due to the movement of piston 68 away from fluid restraining section 70, umbrella portion 28 will flex to permit fluid to flow upward around the periphery of umbrella portion 28 from inlet 62 through passageways 72 into chamber 66. In FIG. 5 when the pressure in the downward direction from chamber 66 through passageway 30 exceeds a second predetermined amount due to the movement of piston 68 toward fluid restraining section 70, lips 38 will open and spread apart permitting fluid to flow downward from chamber 66 through passageway 30 past lips 38 to outlet 64. The combination valve will check the flow of fluid from outlet 64 into chamber 66 and from chamber 66 to inlet 62.

During installation when combination valve 20 is installed into piston pump 60, end 44 of metal sleeve is press-fitted into retainer section 74 by placing metal sleeve 24 of combination valve 20 through fluid restraining section 70 with opposite end 44 of metal sleeve 24 adjacent retainer section 74 and then applying a force to the top of combination valve 20 by contacting upper surfaces 47 of prongs 46 in crenelated end 42 of metal sleeve 24 to press-fit end 44 into retainer section 74. Prongs 46 extending to the top of valve body 22 protect valve body 22 from damage due to the application of force through prongs 44 in the top of combination valve 20.

The combination valve described in this invention may be used in a variety of fluid transfer devices such as fuel and brake systems or in other fields where it is desired to permit flow of fluid in one direction, but to prevent it from flowing in the opposite direction and where a flow or relief action in the opposite direction must be provided. The fluid being checked and released by flexible umbrella portion 28 may be the same or a different fluid as passing through passageway 30.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A combination valve comprising:
   a metal sleeve, said sleeve having an end; and
   a resilient valve body integrally bonded to said metal sleeve, said valve body including an elongated portion defining a passageway therethrough and an annular portion extending from said elongated portion, said elongated portion disposed within said metal sleeve and defining a plurality of flexible lips, said annular portion disposed outside said sleeve.

2. The valve of claim 1, wherein said annular portion defines a check valve.

3. The valve of claim 1, wherein said lips define a check valve.

4. The valve of claim 1, wherein said metal sleeve includes a plurality of prongs disposed on said end.

5. The valve of claim 4, wherein said valve body includes a generally planar surface, said prongs substantially extending to said surface.

6. The valve of claim 1, wherein said lips define a normally closed duckbill valve for preventing fluid flow in a first direction, said lips responsive at a first predetermined fluid pressure to open said passageway to permit fluid flow in a second direction, said annular portion defining a normally closed umbrella valve preventing fluid flow in said second direction, said annular portion responsive at a second predetermined fluid pressure to permit fluid flow in said first direction.

7. A combination valve comprising:
   a metal sleeve, said sleeve having an end; and
   a resilient valve body integrally bonded to said metal sleeve, said valve body having a first elongated portion and a second portion, said first portion preventing fluid flow in a first direction, said first portion responsive at a first predetermined fluid pressure in a second direction to permit fluid flow in said second direction, said second portion preventing fluid flow in said second direction, said second portion responsive at a second predetermined fluid pressure to permit fluid flow in said first direction; said first portion disposed inside said sleeve and said second portion disposed outside said sleeve.

8. The valve of claim 7, wherein said end includes a plurality of prongs.

9. The valve of claim 8, wherein said valve body includes a generally planar surface, said prongs extending to said surface.

10. The valve of claim 7, wherein said first portion includes an elongated member with a plurality of flexible lips.

11. The valve of claim 7, wherein said second portion includes an annular portion extending from said first portion.

12. A combination valve comprising:
    a metal sleeve including a crenelated end defining a plurality of prongs; and
    a resilient valve body attached to said metal sleeve, said valve body including a generally planar surface, said prongs extending substantially to said surface, said valve body including an elongated member defining a passageway therethrough, an annular portion extending from said elongated member, said elongated member disposed within said metal sleeve, said elongated member having a plurality of flexible lips.

13. The valve of claim 12, wherein said lips are normally closed preventing fluid flow in a first direction, said lips being responsive at a first predetermined fluid pressure to permit fluid flow through said passageway in a second direction, said annular portion disposed outside said sleeve, said annular portion normally closed preventing fluid flow in said second direction and responsive at a second predetermined fluid pressure to permit fluid flow in said first direction.

* * * * *